United States Patent [19]
Lehner et al.

[11] Patent Number: 5,853,453
[45] Date of Patent: Dec. 29, 1998

[54] METHOD OF PROCESSING IRON-CONTAINING METTALURGICAL RESIDUAL SUBSTANCES AS WELL AS ARRANGEMENT FOR CARRYING OUT SAID METHOD

[75] Inventors: Johann Lehner; Günter Schrey, both of Linz, Austria

[73] Assignee: Voest-Alpine Industrieanlagenbau GmbH, Linz, Austria

[21] Appl. No.: 750,897

[22] PCT Filed: Apr. 23, 1996

[86] PCT No.: PCT/AT96/00079

§ 371 Date: Dec. 30, 1996

§ 102(e) Date: Dec. 30, 1996

[87] PCT Pub. No.: WO96/34120

PCT Pub. Date: Oct. 31, 1996

[30] Foreign Application Priority Data

Apr. 24, 1995 [AT] Austria .................................. A 701/95

[51] Int. Cl.⁶ .............................. C22B 7/02; C21B 13/14; C21C 5/28
[52] U.S. Cl. .................................. 75/531; 75/961; 266/157
[58] Field of Search ........................ 75/531, 961; 266/157

[56] References Cited

U.S. PATENT DOCUMENTS

| | | |
|---|---|---|
| Re. 30,795 | 11/1981 | Kreiger . |
| 3,403,018 | 9/1968 | Thom .................................. 75/961 |
| 3,948,644 | 4/1976 | Maurice et al. . |
| 4,119,455 | 10/1978 | Cass et al. . |
| 5,364,441 | 11/1994 | Worner .................................. 75/10.63 |
| 5,514,203 | 5/1996 | Grunbacher et al. .................... 75/492 |

FOREIGN PATENT DOCUMENTS

| | | |
|---|---|---|
| B376241 | 10/1984 | Austria . |
| B380901 | 7/1986 | Austria . |
| 0467874 | 1/1992 | European Pat. Off. . |
| 0623684 | 11/1994 | European Pat. Off. . |
| 4123626 | 1/1993 | Germany . |

*Primary Examiner*—Melvyn Andrews
*Attorney, Agent, or Firm*—Ostrolenk, Faber, Gerb & Soffen, LLP

[57] ABSTRACT

In a method of processing iron-containing metallurgical residual substances, offgases containing iron-containing particles are washed out in a wet process and separated in the form of sludge. The sludge is then dehydrated and agglomerated; subsequently, the agglomerates are recycled into an iron melt production process. To recover the iron contained in the sludge, the agglomerates are passed exclusively into a refining stage of the steel production process. The present method may be used in a steel production process which produces steel from pig iron, as well as optionally from scrap and/or iron ore and/or sponge iron. The refining stage is performed using an oxygen blowing process.

22 Claims, 2 Drawing Sheets

METHOD OF PROCESSING IRON-CONTAINING METTALURGICAL RESIDUAL SUBSTANCES AS WELL AS ARRANGEMENT FOR CARRYING OUT SAID METHOD

BACKGROUND OF THE INVENTION

1. Field of the Invention

The invention relates to a method of processing iron-containing metallurgical residual substances washed out from offgases containing iron-containing particles in the wet process and separated in the form of sludges, wherein the sludges are dehydrated and agglomerated and the agglomerates are processed in an iron melt production process, as well as an arrangement for carrying out the method.

2. Description of the Related Art

For a direct reduction process of iron ore followed by the melting of sponge iron under simultaneous coal gasification it is known (AT-B-376.241) to separate from the reducing gas formed in a melting gasifying zone as well as from the offgas forming during direct reduction, solid particles primarily comprised of dusty carbon, to mix the separated solids particles with binder, i.e., with iron oxide dust, to form shaped coke by hot-briquetting and to subsequently recycle the shaped coke to the melting process.

However, in doing so it is disadvantageous that due to the introduction of iron oxides reduction work must be done within the melter gasifier to reduce the iron oxide, thereby withdrawing from the melting procedure energy required for the same and disturbing the process occurring within the melting gasifying zone. Furthermore, so-called hot-briquetting is an expensive solution in terms of investment and operating costs.

From DE-A-41 23 626 it is known to agglomerate metallurgical residual substances of mixed consistencies by using binders, slag formers and reducing agents, and to introduce the agglomerates into the upper burden region of a melting aggregate, preheating and drying of the agglomerates being effected in that burden region of the melting aggregate. The burden passes through the melting aggregate according to the counterflow principle, at first reaching a reduction zone provided in the interior of the melting aggregate and subsequently being melted in the lower region of the melting aggregate.

This known process requires much energy inasmuch as also metallic waste or residual substances have to travel through the reduction zone of the melting aggregate. A particular problem is the strength of the agglomerates, since those agglomerates are used in the green, i.e. not completely dried state, thus causing great difficulties due to disintegration, abrasion etc. in practice. When travelling through the melting aggregate according to the counterflow principle, damage to the agglomerates resulting from pressure an impact forces may cause a high portion of said agglomerates to be discharged from the melting aggregate by the offgas. For this reason, the process disclosed DE-A-41 23 626 is difficult to realize in practice. There would have to be produced agglomerates having high strengths to be preserved even with a high temperature range, which, again, would be very demanding, and, in particular, would require the use of high-quality and accordingly expensive binders.

From AT-B 380.901 is known to convey metal-oxide-containing metallurgical dusts through a rotating tube along with carbon-containing material, to reduce the same in a hot zone of the tube thereby forming sponge iron and to change said sponge iron into a converter as a substitute for cooling scrap. This method has been successful with metal-oxide-containing metallurgical dusts, yet calls for additional apparatus and process-technological expenditures with a view to the adjustment of a reducing atmosphere. Moreover, only simple metal-oxide-containing metallurgical dusts can be processed by to this method; but such method does not provide for the charging of dusts containing major amounts of metallic iron.

A method of the type initially described is known form EP-A-0 623 684. This enables the complete and energy-saving processing of waste and residual substances from the metallurgical industry in a process for the direct reduction of iron ore to sponge iron and melting the sponge iron in a coal gasification zone, wherein it is necessary to collect the waste and residual substances separately in groups according to their chemical composition. A first group primarily comprises iron in the oxide form, a second group comprises iron in the metallic form and a third group primarily comprises carbon-containing substances. The first group is charged into the direct reduction zone and the second and third groups are charged directly into the melting gasifying zone, wherein the thickening and granulating of the waste and residual substances in the form of sludges is effected prior to charging.

The basic idea of the known method consists of recycling the dusts incurred in the offgases during direct reduction or melting and during coal gasification, back to the direct reduction or melting process and coal gasification process, respectively. This is cumbersome since the agglomerates must be supplied back to the same processes from which they are derived. Thus, they must be reheated there, running through said processes a second time, and can be further processed in a consecutive process, e.g. a process for the production of steel from pig iron, only afterwards.

It is generally known to separate in the wet process, dusts incurring in blast-furnace processes, oxygen blowing processes, and in the direct reduction of iron ore to sponge iron, from the offgases formed during such processes, and to dry the sludges thus formed. These sludges are subsequently dumped in most cases for reasons of simplicity and low cost. This has been accepted so far, since such sludges (as dry substances) approximately constitute only 1.5% of the amount of steel produced. With environmental consciousness rising, the avoidance of such dumping sites has been called for to an increasing extent. However, this involves difficulties with respect to as the utilization of dusts in the metallurgical industry implies involving complex procedures such as a selection process. Furthermore the dusts frequently are discharged along with the offgases.

SUMMARY OF THE INVENTION

The present invention is based on the object of effectively processing iron-containing metallurgical residual substances in which iron may be present both in metallic and in oxide forms, at an energy input as low as possible and at an apparatus expenditure involving only low investment costs, by recovering the iron contained in said metallurgical residual substances. In particular, it is to be avoided that the dusts will run several times through consecutive process stages provided in the production of steel, thus constituting additional loads on the same.

In accordance with an embodiment of the present invention, this object is achieved in that the sludges, after dehydration, are mixed with quick lime, granulated and finally are used and processed exclusively in a refining process for the production of steel from pig iron as well as optionally scrap and/or sponge iron and/or ore, using an the oxygen blowing process.

Thereby, it is feasible, in addition to readily working up any iron-containing dust residual substances, to at least partially replace with the agglomerates, i.e. reduce to the extent of the amount of the agglomerates used, the materials necessary for cooling in an oxygen-blowing process, such as iron scrap and/or sponge iron and/or iron ore, which, depending on the economic situation and geographic location of a metallurgical plant, frequently are expensive to obtain or in some cases are not available at all. According to the invention, the dusts are employed in a final stage of the process such that preceding process stages, as for example a direct reduction or a blast furnace process, are not affected by the dust either in terms of quantity or in terms of process efficiency.

Advantageously, the invention provides for the processing of dusts contained in offgases formed in the direct reduction of iron ore to sponge iron and in the melting of sponge iron under simultaneous coal gasification.

Furthermore, the invention suitably provided for the processing of dusts contained in offgases formed in refining during an the oxygen-blowing process as well as for the optional processing of dusts contained in offgases forming in a blast furnace process.

Therein, the metallurgical residual substances are treated in a manner so as to render the same usable for the oxygen-blowing process in a converter without causing any disturbance of the same. To this end, the agglomerated dusts must exhibit special strengths in order to be usable for the high-temperature refining process occurring in the converter.

Preferably, the sludges are dehydrated to a residual moisture content ranging form 30 to 50 wt. %, preferably 32 to 42 wt. %, free water prior to further treatment. As a result, a sludge having such a residual moisture content may be directly charged into a mixing granulator.

According to a preferred embodiment, quick lime, in a granular form having a diameter of up to 1 mm, is added to the sludges during granulation, the quick lime advantageously being added in an amount to which it is completely reacted by the free water contained in the dehydrated sludge. The preferred range of the residual moisture content of the sludge allows for a quantitatively favourable consumption of quick lime.

Advantageously, drying to a residual moisture of a maximum of 5 wt. % free water is carried out after granulates and a sufficiently high strength of the particles is formed by granulates for use in a converter. No disintegration of granulates will occur even in the high-temperature zone of the converter such that the dust discharge from the converter will in no event be increased by the introduction of the granulates.

due to the solid portions of the sludge being recirculated, different high concentrations or enrichments in the dust or sludge may occur with individual substance components. Zinc, lead or also alkalis, such as sodium, for instance, are again and again reduced and evaporated in a metallurgical melting process, the dust or the sludge formed of the dust thus becoming enriched with such substance components.

To control such enrichment, a partial stream of the granulates suitably is eliminated from recirculation, preferably after drying and preferably in amounts up to a maximum of 15%, in particular in an amount of about 10%, of the amount of granulate.

According to a further preferred embodiment, components enriched during recirculation, such as non-iron metals, alkalis, are eliminated, i.e. are separated from the iron fraction.

An arrangement for carrying out the method, comprising a reduction reactor for iron ore, a melter gasifer, a supply duct for reducing gas formed in the melter gasifer connecting the melter gasifer with the reduction reactor, a conveying duct for the reduction product formed in the reduction reactor connecting the reduction reactor with the melter gasifer, an export-gas discharge duct departing from the reduction reactor and conducted through a gas scrubber, supply ducts for oxygen-containing gases and carbon carriers running into the melter gasifer, a tap for pig iron and slag provided at the melter gasifer, is characterized in that the gas scrubber is connected with a sludge treating plant by means of a conveying duct conveying the sludges collecting within the former and the sludge treating plant is coupled by a conveying means with a converter for the production of steel from pig iron as well as optionally scrap and/or iron ore and/or sponge iron in the oxygen-blowing process wherein the sludge treating plant comprises a thickening means, a means for supplying quick lime to the sludge as well as a granulation means followed by a drier.

A preferred embodiment of an arrangement for carrying out the method according to the invention, comprising a blast furnace and an offgas duct for offgas emerging from the blast furnace connecting the blast furnace with a gas scrubber, is characterized in that the gas scrubber is connected with a sludge treating plant by means of a conveying duct conveying the sludges collecting within the former and the sludge treating plant is coupled by a conveying means with a converter for the production of steel from pig iron as well as optionally scrap and/or iron ore and/or sponge iron in the oxygen-blowing process.

An arrangement comprising a converter for the production of steel from pig iron as well as optionally scrap and/or iron ore and/or sponge iron in the oxygen-blowing process and an offgas duct for offgas emerging from the converter connecting the converter with a gas scrubber is characterized in that the gas scrubber is connected with a sludge treating plant by means of conveying duct conveying the sludges collecting within the former and the sludge treating plant is coupled with the converter by conveying means.

According to a preferred embodiment, the drying means is followed by a separation means for substances undesiredly enriching during recirculation, such as non-iron metals, alkalis, said separation means advantageously being designed as a heated rotary tube.

To avoid any concentration of components tending to enrichment, it is also feasible to effect the outward transfer of substances through a branch duct branching off the conveying means coupling the drier with the converter.

BRIEF DESCRIPTION OF THE DRAWINGS

In the following, the invention will be explained in more detail by way of two exemplary embodiments as follows.

BRIEF DESCRIPTION OF THE PREFERRED EMBODIMENTS

Figure 1:
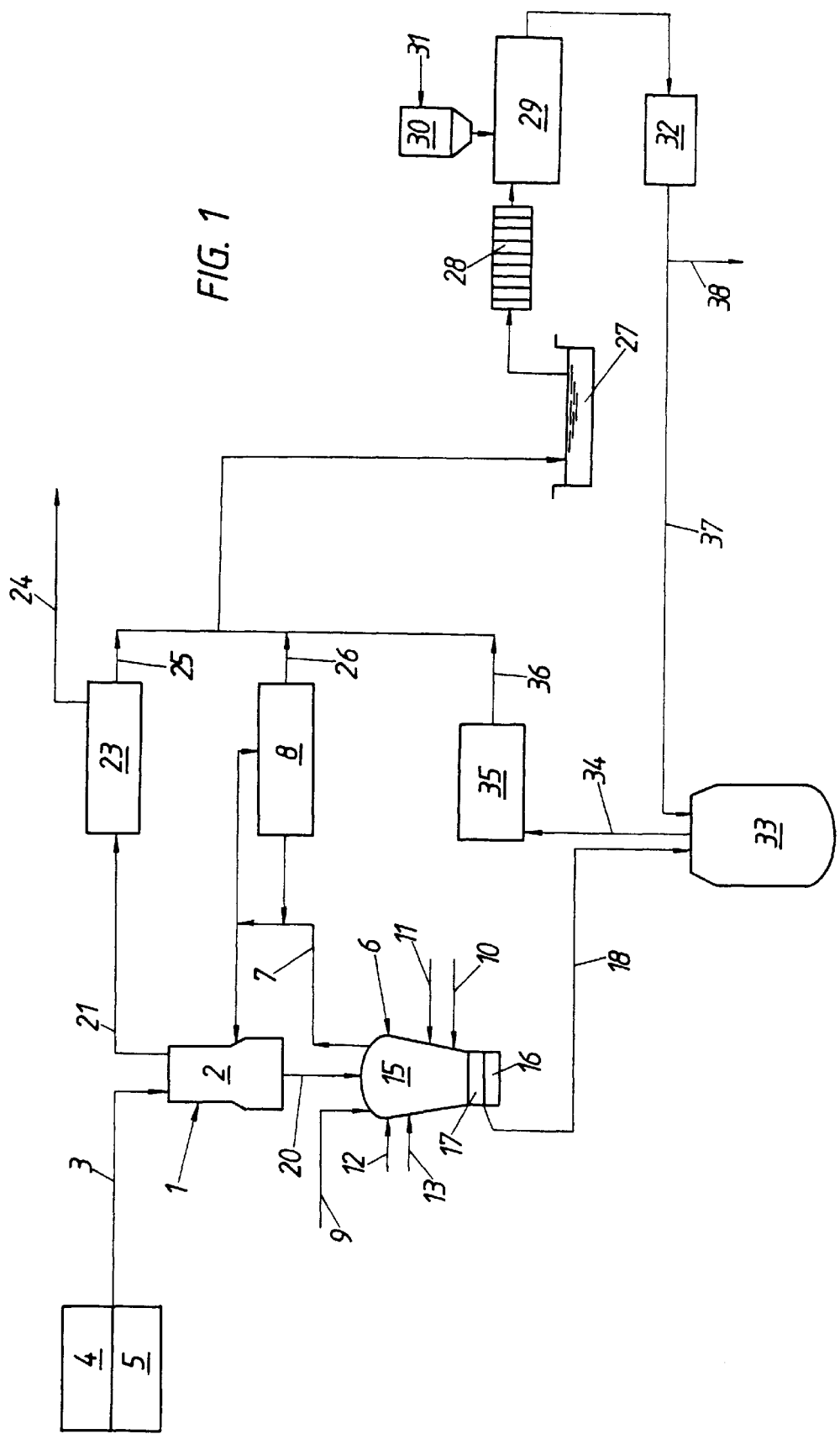
FIG. 1 represents a first preferred arrangement for carrying out the method of the present invention.

Lumpy iron-oxide-containing charging substances 4, such as ore, optionally along with unburnt fluxes 5, are top-charged via a supply duct 3 into a direct reduction means designed as a shaft furnace 1, i.e., into its direct reduction zone 2. The shaft furnace 1 communicates with a melter gasifer 6, in which a reducing gas is produced from carbon carriers and oxygen-containing gas, which reducing gas is fed to the shaft furnace 1 via a supply duct 7, and a gas exiting from a gas purification and a gas cooling means 8 preferably designed as a scrubber being also provided in said supply duct 7.

The melter gasifer 6 comprises a supply duct 9 for solid lumpy carbon carriers, optionally several supply ducts 10, 11 for oxygen-containing gases and supply ducts 12, 13 for carbon carriers which are either liquid or gaseous at room temperature, such as hydrocarbons, as well as for burnt fluxes. In the melter gasifer 6 molten pig iron 16 and molten slag 17 collect below the melting gasifying zone 15 and are tapped via a tap 18.

The lumpy charging substances reduced to sponge iron in the shaft furnace 1 in the direct reduction zone 2 are supplied to the melter gasifer 6 through one or several ducts 20, for instance, by means of a warm type conveyor. To the upper part of the shaft furnace 1 a discharge duct 21 for the top gas forming in the direct reduction zone 2 is connected. This top gas is fed to a gas purification means 23 which is preferably designed as a scrubber. Upon exit for gas purification means 23, the purified gas is available for further use via an export gas duct 24.

In accordance with the present invention, waste substances formed in the gasification and melting process as well as in the reduction process are charged, or recycled, into the steel-producing process.

The sludge waters produced in the scrubbers 8 and 23, via sludge water ducts 25 and 26, are supplied to a thickener designed as a sludge settling basin 27 and subsequently to a dehydration means 28, preferably a filter press or a decanting centrifuge 28, in which the sludges are dehydrated to a residual moisture content of 30 to 50 wt. %, preferably 32 to 42 wt. %, free water. The dehydrated sludge is supplied to an agglomeration means configured as a granulation means 29, such as a mixing granulator 29.

A duct supplying quick lime 30 from a hopper 31 runs into the granulation means 29. The free water content of the sludge supplied to the granulation means 29 is coordinated with the amount and grain size of the quick lime, wherein quick lime is added in an amount that causes the complete reaction of the same by the free water contained in the dehydrated sludge. In doing so, it is most important that the granulate, which upon leaving the granulation means 29 is conducted to a drier 32 and there is subjected to drying to a maximum of 5 wt. % residual moisture free water, will not swell or drive up even after storage for some time. Thus, no free quick lime must be contained in the granulate any longer. The grain size of the quick lime advantageously is in a range of up to about 1 mm.

The strength of the dried granulate is coordinated with the grain size of the granulate and must also be sufficiently high such that the granulate does not disintegrate when subsequently charged into a steelworks converter 33. A strength of 10 to 30 kg/piece of granulate particle at a grain size of 10 to 12.5 mm average diameter per granulate has proved to be particularly advantageous.

The drop number, i.e., the number of standardized dropping of a granulate particle overcome by that granulate particle without damage, is also of relevance. A drop number ranging between 5 and more than 20 according to SME, Mineral Processing Handbook, has proved particularly beneficial to the use in a steelworks converter in connection with the strength and grain size indicated above. The strength of the green granulate, i.e. before drying, advantageously ranges between 1.5 and 7 kg per piece of granulate particle.

According to the embodiment represented in FIG. 1, the offgas drawn through an offgas shaft 34, of the steelworks converter in which a refining process according to the oxygen-blowing method (either by means of an LD lance or by means of sub-bath nozzles or according to any other method) takes place is fed to a wet scrubber 35 and is supplied to the thickener, i.e., sludge settling basin 27, through duct 36. The pig iron 16 tapped from the melter gasifer is charged into the converter.

To avoid the enrichment of components tending to concentrate, such as non-iron metals or alkalis, a portion of the dried granulate is discharged by means of a branch duct 38 branching off the conveying means 37 connecting the drier 32 with the converter 33. A discharge of about 10% of the amount of granulate has proved to be sufficient. The discharged granulate may be used, for instance, in the construction material industry.

The granulation means 29 may be replaced with particle formation by pelletizing, briquetting or sintering. However, granulation has proved to be a particularly beneficial method to in practice, in particular, with a view to the stability of the granulate and also the costs involved.

Figure 2:
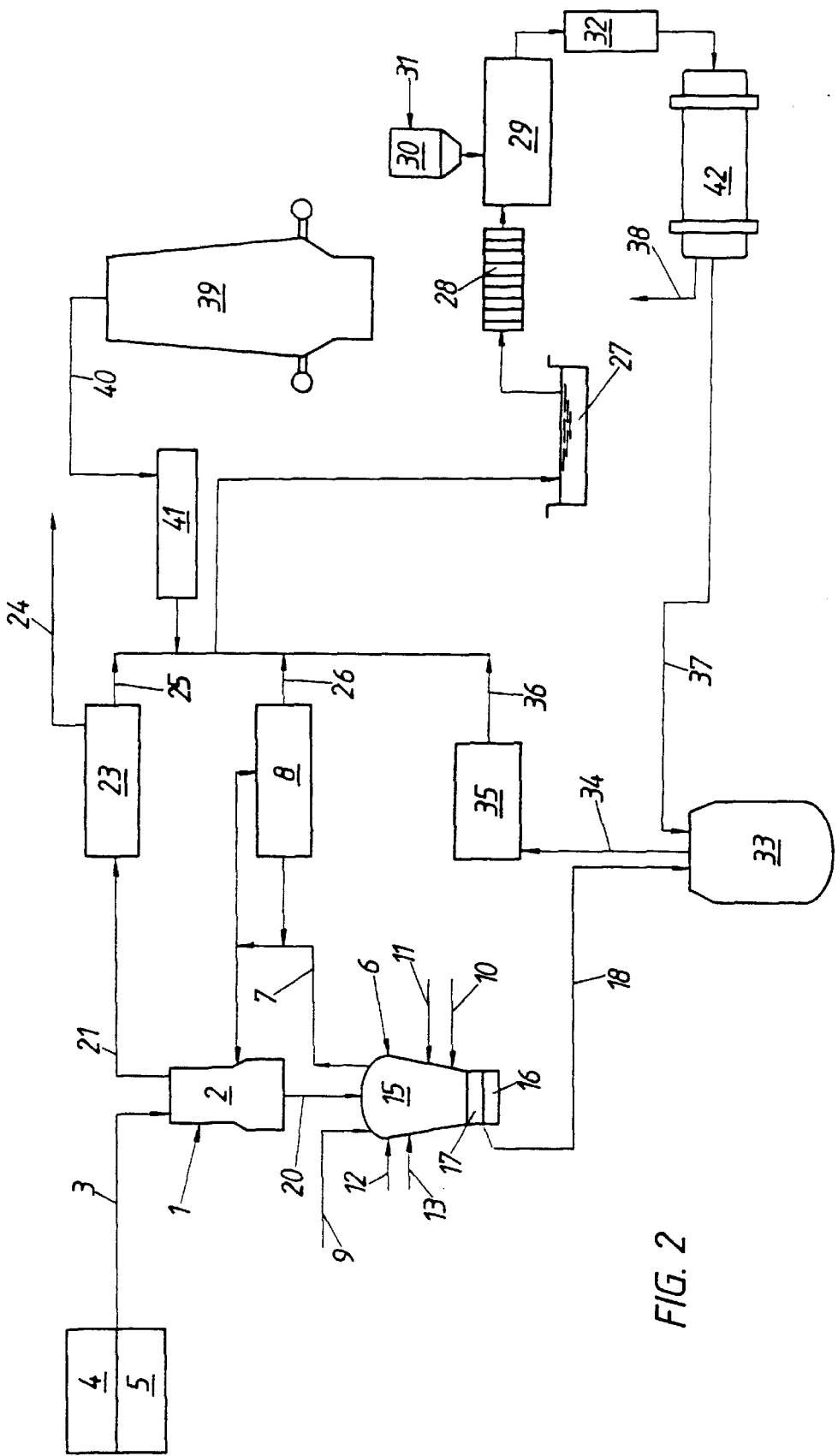
FIG. 2 represents a second preferred arrangement for carrying out the method of the present invention.

According to the arrangement represented in FIG. 2, a blast furnace 39 has been additionally integrated in the process, the offgases of which, via a duct 40, are supplied to a wet scrubber 41 and from there to the thickener 27. Sleucing out of components that tend to concentrate in this case is realized by specific separation in an apparatus suitable for this purpose and design, for instance, a heated rotary tube 42. The granulate passing through the rotary tube 42 subsequently is supplied to the converter 33. The aggregates and material flows additionally required for the operation of the blast furnace and of the converter, such as the supply of the blast furnace with burden and the further conveyance of the pig iron produced in the blast furnace to the converter, have been omitted in the exemplary embodiments illustrated for reasons of simplicity, being irrelevant to the invention.

We claim:

1. A method of processing iron-containing metallurgical residual substances which have been washed out from offgases containing said iron-containing metallurgical residual substances in a steel production process, said method comprising the steps of:

collecting said iron-containing metallurgical residual substances from said offgases using a wet process;

separating said iron-containing metallurgical residual substances from said offgases in the form of a sludge;

dehydrating said sludge;

agglomerating said sludge by mixing said sludge with quick lime after dehydration to bind said sludge, and subsequently granulating the resulting mixture to form granulates; and recycling said granulates in a steel production process by passing said granulates into a refining stage of said steel production process, said refining stage being performed using an oxygen blowing process.

2. A method according to claim 1, wherein said steel production process comprises the steps of:

effecting the direct reduction of iron ore to sponge iron; and melting the sponge iron under simultaneous coal gasification;

wherein said offgases which contain iron-containing metallurgical residual substances include offgases formed in said direct reduction process.

3. A method according to claim 1, wherein said offgases which contain iron-containing metallurgical residual substances included offgases formed by said oxygen blowing process in said refining stage.

4. A method according to claim 1, wherein said offgases which contain iron-containing metallurgical residual substances include offgases formed in a blast furnace process.

5. A method according to claim 1, wherein the sludges are dehydrated to a residual moisture content ranging from 30 to 50 wt. % free water prior to further treatment.

6. A method according to claim 5, wherein the sludge is dehydrated to a residual content ranging from 32 to 42 wt. % free water prior to further treatment.

7. A method according to claim 1, wherein said quick lime is in a granular form having a diameter of up to 1 mm.

8. A method according to claim 7, wherein the quick lime is added in an amount which is completely reacted by free water contained in the dehydrated sludge.

9. A method according to claim 1, further comprising the step of drying said granulates to a residual moisture of a maximum of 5 wt. % free water after said agglomerating step.

10. A method according to claim 1, wherein the granulates include residual amounts of components other than said iron-containing substances which may accumulate upon recycling in the steel production process, and said method further comprises the step of separating out at least a portion of said components from said granulates.

11. A method according to claim 10, further comprising the step of drying said granulate and wherein said eliminating step is performed after said drying step.

12. A method according to claim 10, wherein up to 15% of the stream of granulate is eliminated in said eliminating step.

13. A method according to claim 12, wherein up to 10% of the stream of granulates is eliminated in said eliminating step.

14. An arrangement for carrying out the method according to claim 12 comprising:

a reduction reactor used for the direct reduction of iron ore in the steel production process;

a gas scrubber;

an export-gas discharge duct connecting said reduction reactor gas scrubber;

a sludge treating plant;

a conveying duct connecting said gas scrubber to said sludge treating plant;

a converter in which said refining stage in said production of steel is carried out; and a conveyor connecting said sludge treating plant to said converter;

said sludge treating plant comprising a thickening means to reduce a free water content in said sludge, means for supplying quick lime to said sludge, and granulation means to form said granulates, followed by a dryer.

15. An arrangement for carrying out the method according to claim 3 comprising:

a converter in which said refining stage in said production of steel is carried out;

a gas scrubber;

an offgas duct connecting said converter to said gas scrubber;

a sludge treating plant;

a conveying duct connecting said gas scrubber to said sludge treating plant; and a conveyor connecting said sludge treating plant to said converter;

said sludge treating plant comprising a thickening means to reduce a free water content in said sludge, means for supplying quick lime to said sludge, and granulation means to form said granulates, followed by a dryer.

16. An arrangement for carrying out the method according to claim 4 comprising:

a blast furnace used in said steel production process;

a gas scrubber;

an offgas duct connecting said blast furnace to said gas scrubber;

a sludge treating plant;

a conveying duct connecting said gas scrubber to said sludge treating plant;

a converter in which said refining stage in said production of steel is carried out; and a conveyor connecting said sludge treating plant to said converter;

said sludge treating plant comprising a thickening means to reduce a free water content in said sludge, means for supplying quick lime to said sludge, and granulation means to form said granulates, followed by a dryer.

17. An arrangement according to claim 14, wherein said sludge treating plant further comprises means for controlling enrichment of components other than said iron-containing substances in said granulates which accumulate upon recycling in the steel production process.

18. An arrangement according to claim 15, wherein said sludge treating plant further comprises means for controlling enrichment of components other than said iron-containing substances in said granulates which accumulate upon recycling in the steel production process.

19. An arrangement according to claim 16, wherein said sludge treating plant further comprises means for controlling enrichment of components other than said iron-containing substances in said granulates which accumulate upon recycling in the steel production process.

20. A method of processing iron-containing metallurgical residual substances recovered from offgases containing said iron-containing metallurgical residual substances in a steel production process, said method comprising the steps of:

obtaining a sludge of said iron-containing metallurgical residual substances using wet process;

dehydrating said sludge;

agglomerating said sludge to form agglomerates of said iron-containing substances; and recycling said sludge in said steel production process by passing said agglomerates into a refining stage of said steel production process, said refining stage being performed using an oxygen blowing process.

21. The method according to claim 20, wherein said step of agglomerating includes the step of mixing said sludge with quick lime to bond said iron-containing substances in said sludge, said mixing step being performed after said dehydrating step.

22. The method according to claim 20, wherein said agglomerates are formed by granulation.

* * * * *

UNITED STATES PATENT AND TRADEMARK OFFICE
CERTIFICATE OF CORRECTION

PATENT NO. : 5,853,453
DATED : December 29, 1998
INVENTOR(S) : Lehner et al.

It is certified that error appears in the above-identified patent and that said Letters Patent is hereby corrected as shown below:

Claim 3, Column 7, line 3, change "included" to --include--.

Claim 14, Column 7, line 39, change "12" to --2--; and line 45, after "reactor", insert --to said--.

Signed and Sealed this

Sixth Day of April, 1999

Attest:

Q. TODD DICKINSON

*Attesting Officer*  *Acting Commissioner of Patents and Trademarks*